US012160709B2

(12) United States Patent
Derleth et al.

(10) Patent No.: US 12,160,709 B2
(45) Date of Patent: Dec. 3, 2024

(54) SYSTEMS AND METHODS FOR SELECTING A SOUND PROCESSING DELAY SCHEME FOR A HEARING DEVICE

(71) Applicant: SONOVA AG, Staefa (CH)

(72) Inventors: Ralph Peter Derleth, Hinwil (CH); Eleftheria Georganti, Zollikon (CH); Markus Hofbauer, Hombrechtikon (CH); Gilles Courtois, Corminboeuf (CH); Erwin Kuipers, Wolfhausen (CH); Antonio Hoelzl, Zurich (CH)

(73) Assignee: Sonova AG, Staefa (CH)

( * ) Notice: Subject to any disclaimer, the term of this patent is extended or adjusted under 35 U.S.C. 154(b) by 304 days.

(21) Appl. No.: 17/893,591

(22) Filed: Aug. 23, 2022

(65) Prior Publication Data

US 2024/0073629 A1 Feb. 29, 2024

(51) Int. Cl.
*H04R 25/00* (2006.01)

(52) U.S. Cl.
CPC ......... *H04R 25/505* (2013.01); *H04R 25/305* (2013.01); *H04R 25/70* (2013.01); *H04R 2225/41* (2013.01)

(58) Field of Classification Search
CPC .... H04R 25/505; H04R 25/305; H04R 25/70; H04R 2225/41
USPC .......................................................... 381/56
See application file for complete search history.

(56) References Cited

U.S. PATENT DOCUMENTS

| | | | |
|---|---|---|---|
| 5,742,694 | A | 4/1998 | Eatwell |
| 11,217,268 | B2 | 1/2022 | Laberge et al. |
| 2004/0259605 | A1 | 12/2004 | Quigley et al. |
| 2009/0017784 | A1 | 1/2009 | Dickson et al. |
| 2010/0198899 | A1 | 8/2010 | Steele et al. |
| 2013/0336499 | A1 | 12/2013 | Beckhardt et al. |
| 2015/0304782 | A1 | 10/2015 | Zurbrugg |
| 2016/0099008 | A1 | 4/2016 | Barker et al. |
| 2017/0208397 | A1 | 7/2017 | Aubreville et al. |
| 2017/0311093 | A1 | 10/2017 | Andersen et al. |
| 2018/0350379 | A1 | 12/2018 | Wung et al. |
| 2019/0082276 | A1 | 3/2019 | Crow et al. |
| 2019/0172476 | A1 | 6/2019 | Wung et al. |
| 2019/0246221 | A1 | 8/2019 | Shariati |

(Continued)

FOREIGN PATENT DOCUMENTS

| | | | | |
|---|---|---|---|---|
| CN | 1842225 B | * | 7/2012 | ........... H04R 25/305 |
| CN | 113038349 A | | 6/2021 | |

(Continued)

*Primary Examiner* — Sean H Nguyen
(74) *Attorney, Agent, or Firm* — ALG Intellectual Property, LLC

(57) ABSTRACT

An exemplary system includes a memory storing instructions and one or more processors communicatively coupled to the memory and configured to execute the instructions to perform a process comprising: accessing fitting data representative of fitting parameters set by a fitting application to fit a hearing device to a user; determining user behavior data indicative of a hearing intention of the user in an auditory scene where the user is located; determining auditory scene data representative of information about the auditory scene; and implementing, based on the fitting data, the user behavior data, and the auditory scene data, a sound processing delay scheme for use by the hearing device.

20 Claims, 8 Drawing Sheets

(56) References Cited

U.S. PATENT DOCUMENTS

| | | | |
|---|---|---|---|
| 2019/0356718 | A1 | 11/2019 | Haustein et al. |
| 2019/0356990 | A1 | 11/2019 | Arnold et al. |
| 2020/0021923 | A1 | 1/2020 | Elmedyb et al. |
| 2021/0274295 | A1 | 9/2021 | Elmedyb et al. |
| 2022/0124443 | A1 | 4/2022 | Courtois et al. |

FOREIGN PATENT DOCUMENTS

| | | | | | |
|---|---|---|---|---|---|
| CN | 113259825 | B | | 10/2021 | |
| DE | 102010026884 | B4 | | 11/2013 | |
| DE | 102014204557 | A1 | | 9/2015 | |
| EP | 1439732 | B1 | | 11/2007 | |
| EP | 2129170 | B1 | | 2/2012 | |
| EP | 2351383 | B1 | * | 9/2012 | ............. H04R 25/70 |
| EP | 2768246 | A1 | | 8/2014 | |
| EP | 1801786 | B1 | | 12/2014 | |
| EP | 3432305 | A1 | | 1/2019 | |
| WO | 2006114015 | A3 | | 4/2007 | |
| WO | 2008118279 | A1 | | 10/2008 | |
| WO | 2009043066 | A1 | | 4/2009 | |
| WO | 2016112969 | A1 | | 7/2016 | |
| WO | 2019043246 | A1 | | 3/2019 | |
| WO | WO-2021081412 | A1 | * | 4/2021 | ........... A61B 5/0022 |
| WO | 2021110924 | A1 | | 6/2021 | |

* cited by examiner

SYSTEMS AND METHODS FOR SELECTING A SOUND PROCESSING DELAY SCHEME FOR A HEARING DEVICE

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

Hearing devices typically introduce acoustic delays (e.g., in the range of 4-8 milliseconds) compared to an audio signal arriving directly at an ear drum of a user of a hearing device. Such acoustic delays are typically introduced by the hearing device based on a chosen signal processing technology and frequency resolution (e.g., the number, spacing, and width of independently adjustable frequency bands). Advances in computational power have facilitated a combination of relatively longer and relatively shorter acoustic delays in a signal processing path of modern hearing devices. However, there are various drawbacks associated with implementing different amounts of acoustic delays in a signal processing path. For example, perceptual effects of a low acoustic delay solution are favorable for signal quality aspects but are more prone to acoustic stability problems (e.g., with respect to feedback and/or feedback management). Further, typical average acoustic delay solutions involve a compromise in sound quality and achievable acoustic stability for most hearing device users with age related high frequency losses. Furthermore, long acoustic delay solutions are favorable for suppression of unwanted sounds but are typically prone to own-voice problems and may result in users experiencing a reduced sense of immersion in the acoustic environment around them.

Selecting which acoustic delay solution to use in a given situation involves choosing a trade-off between the available time for optimal sound enhancement and achievable sound quality/naturalness. However, the selection process is influenced by various aspects that make it difficult to determine which acoustic delay solution to use in a given situation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for selecting a sound processing delay scheme for a hearing device are described herein. As will be described in more detail below, an exemplary system may access fitting data representative of fitting parameters set by a fitting application to fit a hearing device to a user, determine user behavior data indicative of a hearing intention of the user in an auditory scene where the user is located, determine auditory scene data representative of information about the auditory scene, and implement, based on the fitting data, the user behavior data, and the auditory scene data, a sound processing delay scheme for use by the hearing device.

By providing systems and methods such as those described herein, it may be possible to leverage various different types of data (e.g., fitting data, user behavior data, auditory scene data, etc.) to facilitate selecting an optimal sound processing delay scheme for use by a hearing device in multiple different hearing environment situations. For example, systems and methods such as those described herein may leverage such data to determine an optimal sound processing delay scheme to be used based on a trade-off between an available amount of time for optimal sound enhancement versus achievable sound quality/naturalness. Other benefits of the systems and methods described herein will be made apparent herein.

Figure 1:
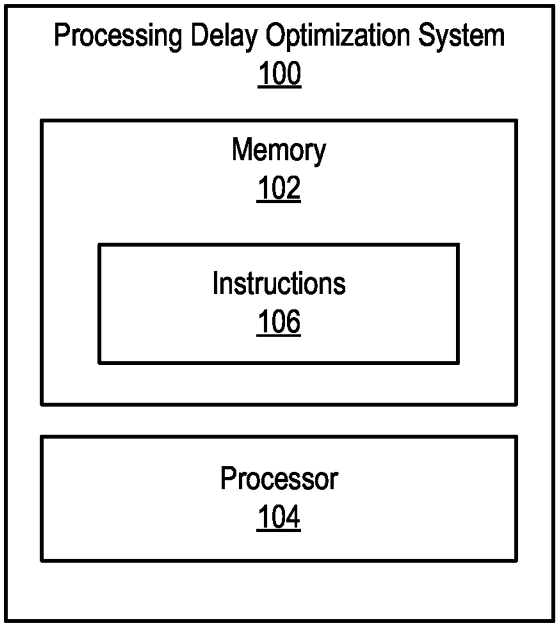
FIG. 1 illustrates an exemplary processing delay optimization system that may be implemented according to principles described herein.

FIG. 1 illustrates an exemplary processing delay optimization system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data associated with hearing device fitting software information, user input information (e.g., via hearing device setting adjustments, user application adjustments, etc.), user behavior pattern data, context information, user hearing/listening intention information, user interface information, user sensitivity information (e.g., sensitivity to comb filtering effects), notification information, hearing profile information (e.g., hearing impairment type), internet of things ("IoT") information, acoustic coupling information, graphical user interface content, acoustic scene data (e.g., noise level, types of noise sources, number of noise sources, etc.), and/or any other suitable data.

Processor 104 may be configured to perform (e.g., execute instructions 106 stored in memory 102 to perform) various processing operations associated with selecting a sound processing delay scheme for a hearing device. For example, processor 104 may perform one or more operations described herein to implement, based on fitting data, user behavior data, and auditory scene data, a sound processing delay scheme for use by a hearing device. These and other operations that may be performed by processor 104 are described herein.

System 100 may be implemented in any suitable manner. For example, system 100 may be implemented as a hearing device, a communication device communicatively coupled to the hearing device, or a combination of the hearing device and the communication device.

As used herein, a "hearing device" may be implemented by any device or combination of devices configured to provide or enhance hearing to a user. For example, a hearing device may be implemented by a hearing aid configured to amplify audio content to a recipient, a sound processor included in a cochlear implant system configured to apply electrical stimulation representative of audio content to a recipient, a sound processor included in a stimulation system configured to apply electrical and acoustic stimulation to a recipient, or any other suitable hearing prosthesis. In some examples, a hearing device may be implemented by a behind-the-ear ("BTE") housing configured to be worn behind an ear of a user. In some examples, a hearing device may be implemented by an in-the-ear ("ITE") component configured to at least partially be inserted within an ear canal of a user. In some examples, a hearing device may include a combination of an ITE component, a BTE housing, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type. For example, a first hearing device may be a hearing aid and a second hearing device may be a sound processor included in a cochlear implant system.

Figure 2:
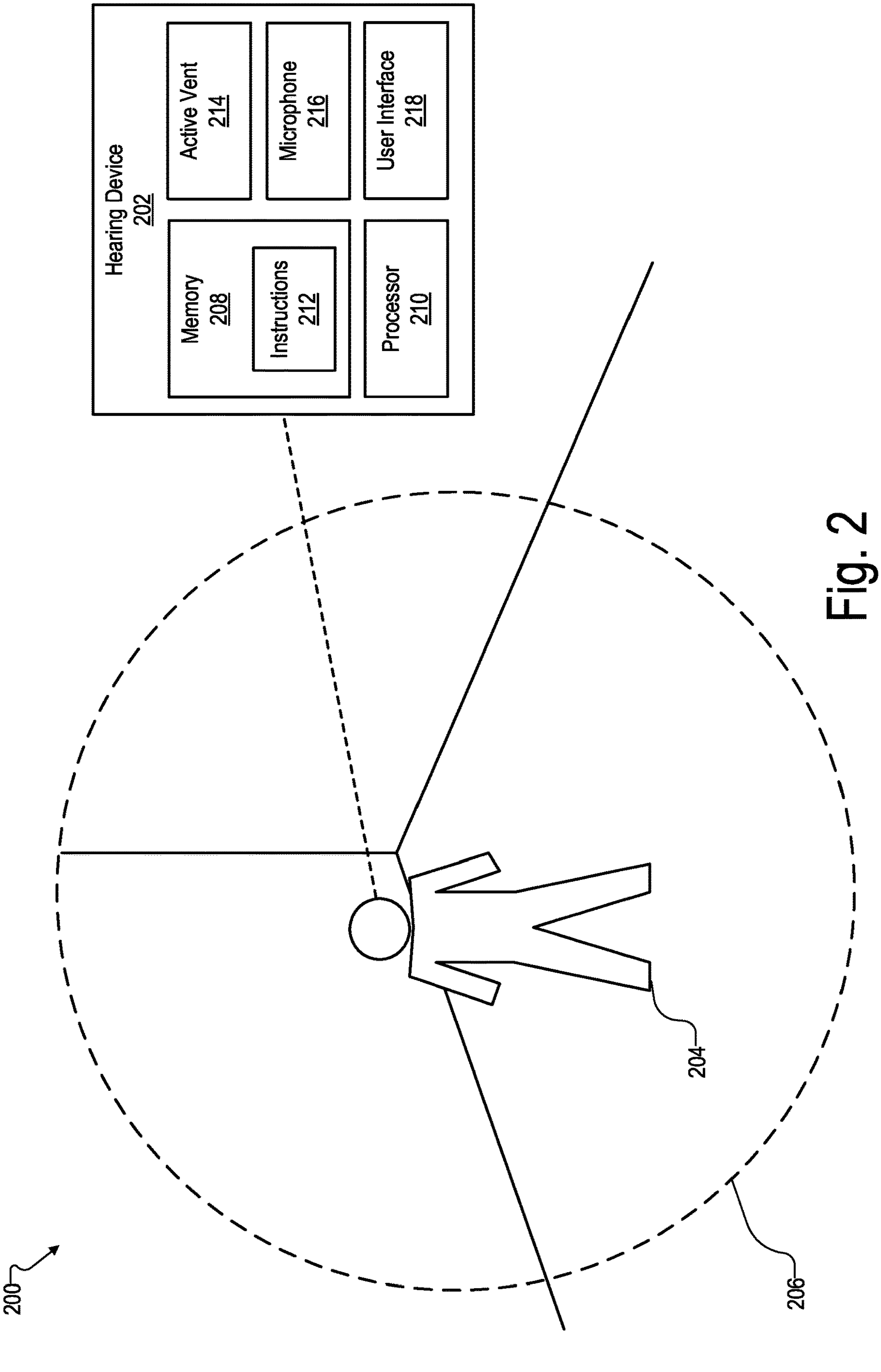
FIG. 2 illustrates an exemplary implementation of the processing delay optimization system of FIG. 1 according to principles described herein.

FIG. 2 shows an exemplary implementation 200 in which system 100 may be provided in certain examples. As shown in FIG. 2, implementation 200 includes a hearing device 202 that is associated with a user 204 located in an auditory scene 206.

Hearing device 202 may include, without limitation, a memory 208 and a processor 210 selectively and communicatively coupled to one another. Memory 208 and processor 210 may each include or be implemented by hardware and/or software components (e.g., processors, memories, communication interfaces, instructions stored in memory for execution by the processors, etc.). In some examples, memory 208 and processor 210 may be housed within or form part of a BTE housing. In some examples, memory 208 and processor 210 may be located separately from a BTE housing (e.g., in an ITE component). In some alternative examples, memory 208 and processor 210 may be distributed between multiple devices (e.g., multiple hearing devices in a binaural hearing system) and/or multiple locations as may serve a particular implementation.

Memory 208 may maintain (e.g., store) executable data used by processor 210 to perform any of the operations associated with hearing device 202. For example, memory 208 may store instructions 212 that may be executed by processor 210 to perform any of the operations associated with hearing device 202 assisting a user in hearing and/or any of the operations described herein. Instructions 212 may be implemented by any suitable application, software, code, and/or other executable data instance.

Memory 208 may also maintain any data received, generated, managed, used, and/or transmitted by processor 210. For example, memory 208 may maintain any suitable data associated with a hearing loss profile of a user and/or user interface data. Memory 208 may maintain additional or alternative data in other implementations.

Processor 210 is configured to perform any suitable processing operation that may be associated with hearing device 202. For example, when hearing device 202 is implemented by a hearing aid device, such processing operations may include monitoring ambient sound and/or representing sound to user 204 via an in-ear receiver. Processor 210 may be implemented by any suitable combination of hardware and software.

As shown in FIG. 2, hearing device 202 further includes an active vent 214, a microphone 216, and a user interface 218 that may each be controlled in any suitable manner by processor 210.

Active vent 214 may be configured to dynamically control opening and closing of a vent opening in hearing device 202 (e.g., a vent opening in an ITE component). Active vent 214 may be configured to control a vent opening by way of any suitable mechanism and in any suitable manner. For example, active vent 214 may be implemented by an actuator that opens or closes a vent opening based on a user input. One example of an actuator that may be used as part of active vent 214 is an electroactive polymer that exhibits a change in size or shape when stimulated by an electric field. In such examples, the electroactive polymer may be placed in a vent opening or any other suitable location within hearing device 202. In a further example, active vent 214 may use an electromagnetic actuator to open and close a vent opening. In a further example, active vent 214 may not only fully open and close but may be positioned in any one of various intermediate positions (e.g., a half open position, a one third open position, a one fourth open position, etc.). In a further example, active vent 214 may be either fully open or fully closed. The position of active vent 214 may be indicative of an acoustic coupling state of hearing device 202.

Microphone 216 may be configured to detect ambient sound in auditory scene 206 surrounding user 204 of hearing device 202. Microphone 216 may be implemented in any suitable manner. For example, microphone 216 may include a microphone that is arranged so as to face outside an ear canal of user 204 while an ITE component of hearing device 202 is worn by user 204. Although only one microphone 216 is shown in FIG. 2, it is understood that hearing device 202 may include any suitable number of microphones as may serve a particular implementation. For example, in addition to microphone 216, hearing device 202 may include an additional microphone that is an in-the-canal microphone arranged on an ITE component of hearing device 202. Such an in-the-canal microphone may be configured to monitor sound and/or any other suitable effect (e.g., a comb filter effect) within the ear canal of user 204 while the ITE component is worn by user 204.

User interface 218 may include any suitable type of user interface as may serve a particular implementation. For example, user interface 218 may include one or more buttons provided on a surface of hearing device 202 that are configured to control functions of hearing device 202. For example, such buttons may be mapped to and control power, volume, or any other suitable function of hearing device 202.

Auditory scene 206 may correspond to any suitable acoustic environment where user 204 may be located during use of hearing device 202. For example, auditory scene 206 may correspond to an indoor scene, an outdoor scene, or any other suitable type of scene. In certain examples, auditory scene 206 may be associated with a context in which it may be desirable to process audio content in a particular manner for user 204. For example, auditory scene 206 may be associated with a noisy restaurant context, a busy street context, a quiet room context, a streaming context where user 204 is streaming audio content by way of hearing device 202, a context where user 204 is speaking, a context where user 204 is listening to a conversation of others, or any other suitable context.

While user 204 is located within auditory scene 206, it may be desirable to select an optimal sound processing delay scheme for hearing device 202 to use when representing audio content to user 204. To that end, system 100 (e.g., processor 104) may access data associated with hearing device 202, user 204, and/or auditory scene 206 to facilitate selecting an optimal sound processing delay scheme to be used by hearing device 202. Such data may represent any suitable user-related information and/or auditory scene-related information as may serve a particular implementation. For example, such data may be representative of static information (e.g., individual annoyance to delay) and dynamic information (e.g., own-voice activity, reverberation, listening context, etc.).

Figure 3:
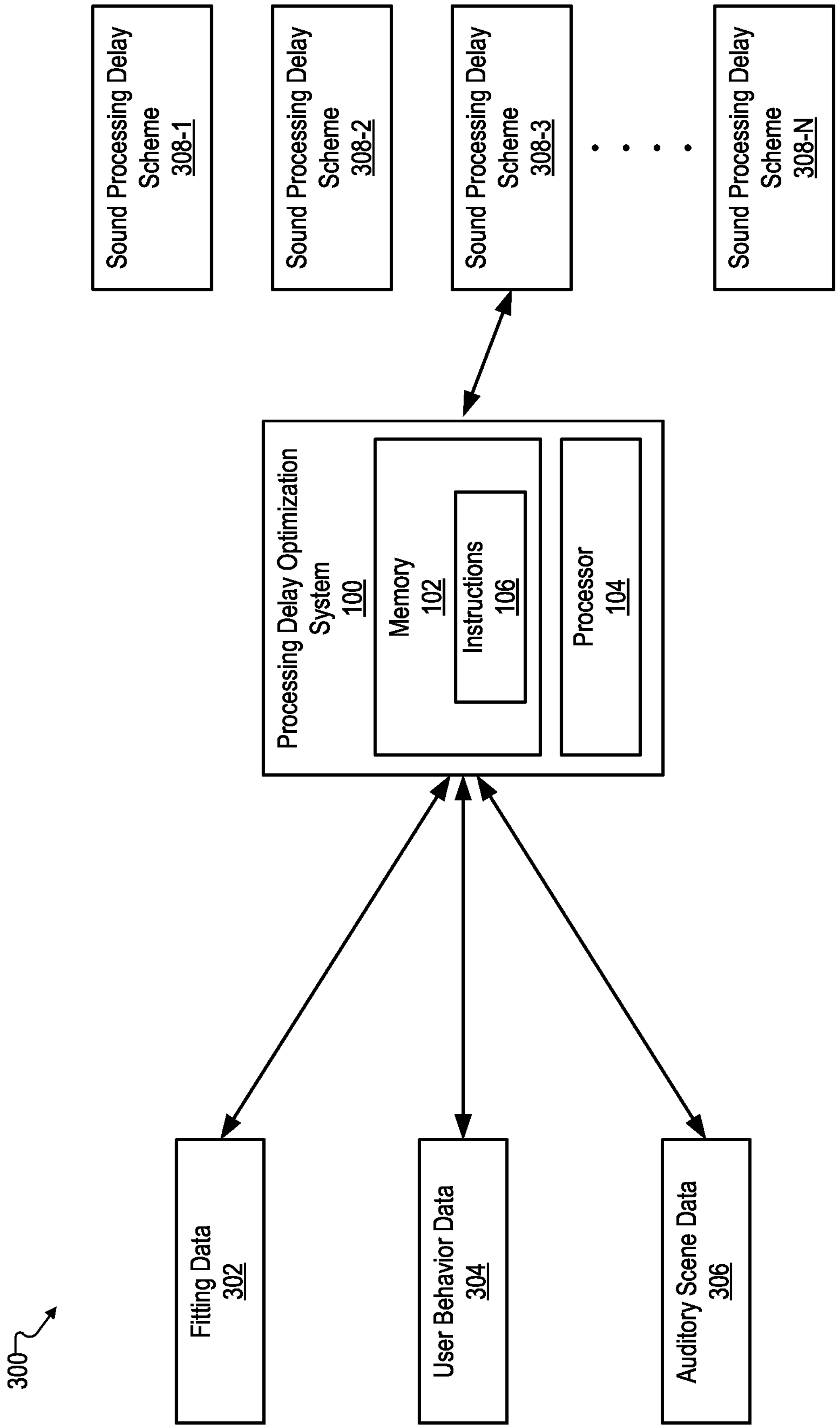
FIG. 3 illustrates an exemplary flow diagram that may be implemented according to principles described herein.

FIG. 3 illustrates an exemplary flow diagram 300 depicting various different types of data that may be accessed or determined by system 100 to facilitate selecting an optimal sound processing delay scheme to be used by hearing device 202. For example, system 100 may access or determine fitting data 302, user behavior data 304, and/or auditory scene data 306. Fitting data 302 may be representative of fitting parameters set by a fitting application used to fit hearing device 202 to user 204. Such a fitting application may be used by a hearing care professional (e.g., an audiologist) during a fitting session when hearing device 202 is initially fit to user 204 and/or during a follow-up fitting session. Fitting data 302 may include any suitable fitting parameters as may serve a particular implementation. For example, fitting parameters may include sound processor settings, user hearing profile information, user feedback information, acoustic coupling information (e.g., indicating a current opening state of an active vent), and/or any other suitable fitting parameter.

User behavior data 304 may include any suitable data that may be indicative of a hearing intention of user 204 in auditory scene 206 where user 204 is located. For example, user behavior data 304 may include context information associated with auditory scene 206, behavioral pattern data, IoT information, user input information (e.g., user inputs provided by way of user interface 218) that influences operation of hearing device 202, and/or any other suitable information. System 100 may use such information in any suitable manner to determine a hearing intention of user 204 in auditory scene 206. For example, if behavioral pattern data indicates that user 204 typically walks down a busy sidewalk a certain time of day on their way to work, system 100 may determine that a hearing intention of user 204 is to sufficiently perceive ambient sounds (e.g., doppler sounds of passing cars) to facilitate user 204 safely walking down the sidewalk.

Auditory scene data 306 may be representative of any suitable information that may be associated with auditory scene 206. For example, auditory scene data 306 may include information indicative of reverberation, sound level, sound type (e.g., an own voice sound type), and/or number of sound sources.

In certain examples, system 100 may estimate, based on fitting data 302, a sensitivity of a user a hearing device to perceive a comb filter effect. Such a comb filter effect is a measurable and acoustically perceivable effect of mixing (e.g., overlaying) the same audio signal several times with a delay. In the frequency domain, a comb filter effect may be detected as ripples on a fine scale frequency spectrum. In certain examples, a comb filter effect may be perceived by user 204 as coloration or hollowness of an audio signal. For relatively longer delays, a comb filter effect may result in an echo-like perception for user 204. Therefore, avoidance of a user's perception of a comb filter effect generally results in an increase in sound quality.

System 100 may estimate a sensitivity of a user to perceive a comb filter effect in any suitable manner. For example, during a fitting process, user 204 may be presented with different audio signals having comb filter effects with varying magnitudes. User 204 may provide feedback regarding the perceptibility of the comb filter effects in the different audio signals. System 100 may estimate the sensitivity of user 204 to the comb filter effect based on the feedback provided during the fitting process.

Based on fitting data 302, user behavior data 304, and auditory scene data 306, system 100 may implement one or more of sound processing delay schemes 308 (e.g., sound processing delay schemes 308-1 through 308-N) for use by hearing device 202. Sound processing delay schemes 308 may be selectively implemented by system 100 to increase sound quality and improve the user experience associated with using hearing device 202. System 100 may select which sound processing delay scheme 308 to use in a given situation in any suitable manner. For example, system 100 may evaluate all of the information included as part of fitting data 302, user behavior data 304, and auditory scene data 306 to determine an optimal delay to use in a given situation. In certain implementations, such an evaluation may include weighting certain information included as part of fitting data 302, user behavior data 304, and auditory scene data 306 relatively more than other information. In certain examples, system 100 may perform an optimization between perceived negative effects (e.g., perceived comb filter effects) caused by delay and a required algorithmic delay for a sound enhancement algorithm. In certain examples, system 100 may also use an actual delay as an additional input for determining which sound processing delay scheme 308 to use in a given situation.

In certain examples, one or more of sound processing delay schemes may be implemented to reduce perception of a comb filter effect by user 204 of hearing device 202. To that end, in certain examples, system 100 may be configured to detect a comb filter effect. This may be accomplished in any suitable manner. For example, system 100 may use an in-the-canal microphone of hearing device 202 to detect the comb filter effect. In certain examples, system 100 may use the in-the-canal microphone to detect a magnitude of the comb filter effect. Based on the magnitude of the comb filter effect, system 100 may select one of sound processing delay schemes 308 that are configured to reduce the magnitude of the comb filter effect detected by the in-the-canal microphone.

In certain examples, the same sound processing delay scheme included in sound processing delay schemes 308 may be applied to all of the frequencies of an audio signal. For example, sound processing delay scheme 308-1 may result in a first amount of delay being applied across all of the frequencies included in an audio signal. In certain alternative examples, one or more of sound processing delay schemes 308 may be frequency dependent. For example, system 100 may implement sound processing delay scheme 308-1 for a first range of frequencies included in an audio signal and may implement sound processing delay scheme 308-2 for a second range of frequencies included in the audio signal.

In certain examples, each of sound processing delay schemes 308 may provide a different amount of acoustic delay. For example, sound processing delay scheme 308-1 may provide a first amount of acoustic delay, sound processing delay scheme 308-2 may provide a second amount of acoustic delay that is less than the first amount of acoustic delay, and sound processing delay scheme 308-3 may provide a third amount of acoustic delay that is less than the first amount of acoustic delay and the second amount of acoustic delay.

Figure 4:
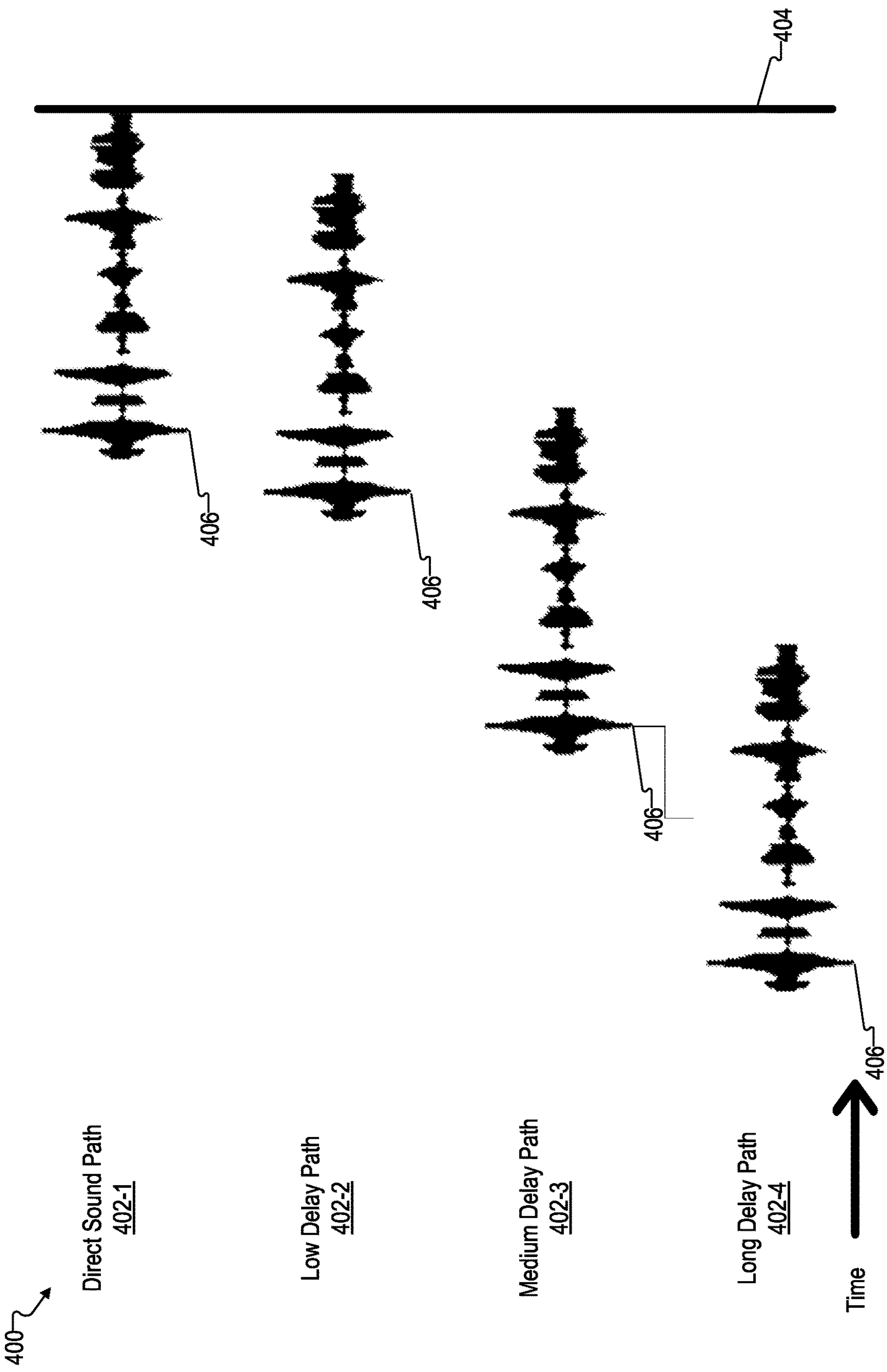
FIG. 4 illustrates an exemplary schematic visualization showing different delay paths that may be implemented according to principles described herein.

Any suitable amount of acoustic delay may be associated with sound processing delay schemes 308 as may serve a particular implementation. FIG. 4 depicts a schematic visualization 400 of different delay paths 402 (e.g., delay paths 402-1 through 402-4) that may be implemented by system 100 based on sound processing delay schemes 308. For example, direct sound path 402-1 may be associated with sound processing delay scheme 308-1, low delay path 402-2 may be associated with sound processing delay scheme 308-2, medium delay path 402-3 may be associated with sound processing delay scheme 308-3, and so forth. In FIG. 4, the horizontal axis represents time in arbitrary units and the vertical axis represents a tympanic membrane 404 of user 204 where the mixture of the different sounds in an audio signal 406 leads to a specific vibration based on the intensity and phase the signal mixture of audio signal 406. For illustration, FIG. 4 shows the same audio signal 406 being presented multiple times with different amounts of acoustic delays. For example, direct sound path 402-1 does not include any acoustic delay and low delay path 402-2, medium delay path 402-3, and long delay path 402-4 are each associated with increasingly longer amounts of acoustic delays. Exemplary situations in which different delay paths such as delay paths 402 may be implemented are described further herein.

Figure 5:
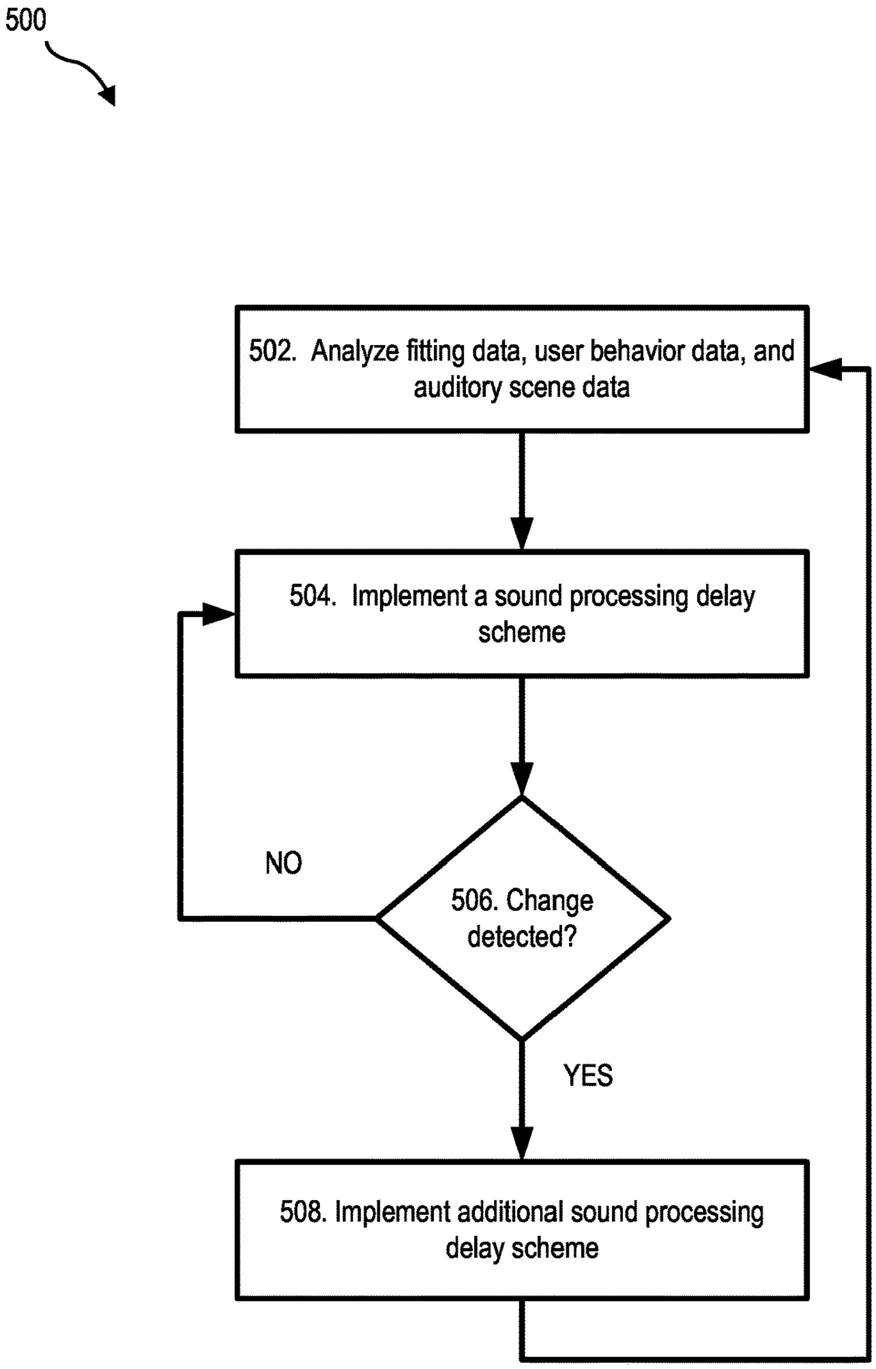
FIGS. 5-6 illustrate exemplary flow diagrams that may be implemented according to principles described herein.

FIG. 5 illustrates an exemplary flow diagram 500 that depicts various operations that may be performed by system 100 in conjunction with selecting one or more of sound processing delay schemes 308. At operation 502, system 100 may analyze fitting data 302, user behavior data 304, and auditory scene data 306 in any suitable manner.

At operation 504, system 100 may implement, based on fitting data 302, user behavior data 304, and auditory scene data 306, a sound processing delay scheme for use by hearing device 202. For example, system 100 may direct hearing device 202 to implement a sound processing delay scheme associated with a low delay path in circumstances where system 100 determines that user 204 is speaking. Alternatively, system 100 may direct hearing device 202 to implement a sound processing delay scheme associated with a relatively longer delay path if system 100 determines that reverberation in auditory scene 206 is above a predefined threshold.

At operation 506, system 100 may determine whether a change has been detected that may influence which sound processing delay scheme is optimal for hearing device 202 to use. If the answer at operation 506 is "NO," the flow may return to operation 504 and hearing device 202 may continue to implement the same sound processing delay scheme implemented at operation 504.

If the answer at operation 506 is "YES," system 100 may direct hearing device 202 to implement an additional sound processing delay scheme at operation 506 in place of the sound processing delay scheme implemented at operation 504. For example, system 100 may determine that there has been a change in the own-voice detection of user 204 (e.g., user 204 has stopped speaking). As a result, system 100 may direct hearing device 202 to switch from using a sound processing delay scheme associated with a low delay path to using a sound processing delay scheme associated with, for example, a medium delay path or a long delay path depending on the detected change.

After operation 508, the flow may return to operation 502 and system 100 may continue to analyze fitting data 302, user behavior data 304, and auditory scene data 306 to facilitate system 100 selecting an optimal sound processing delay scheme for use by hearing device 202.

Figure 6:
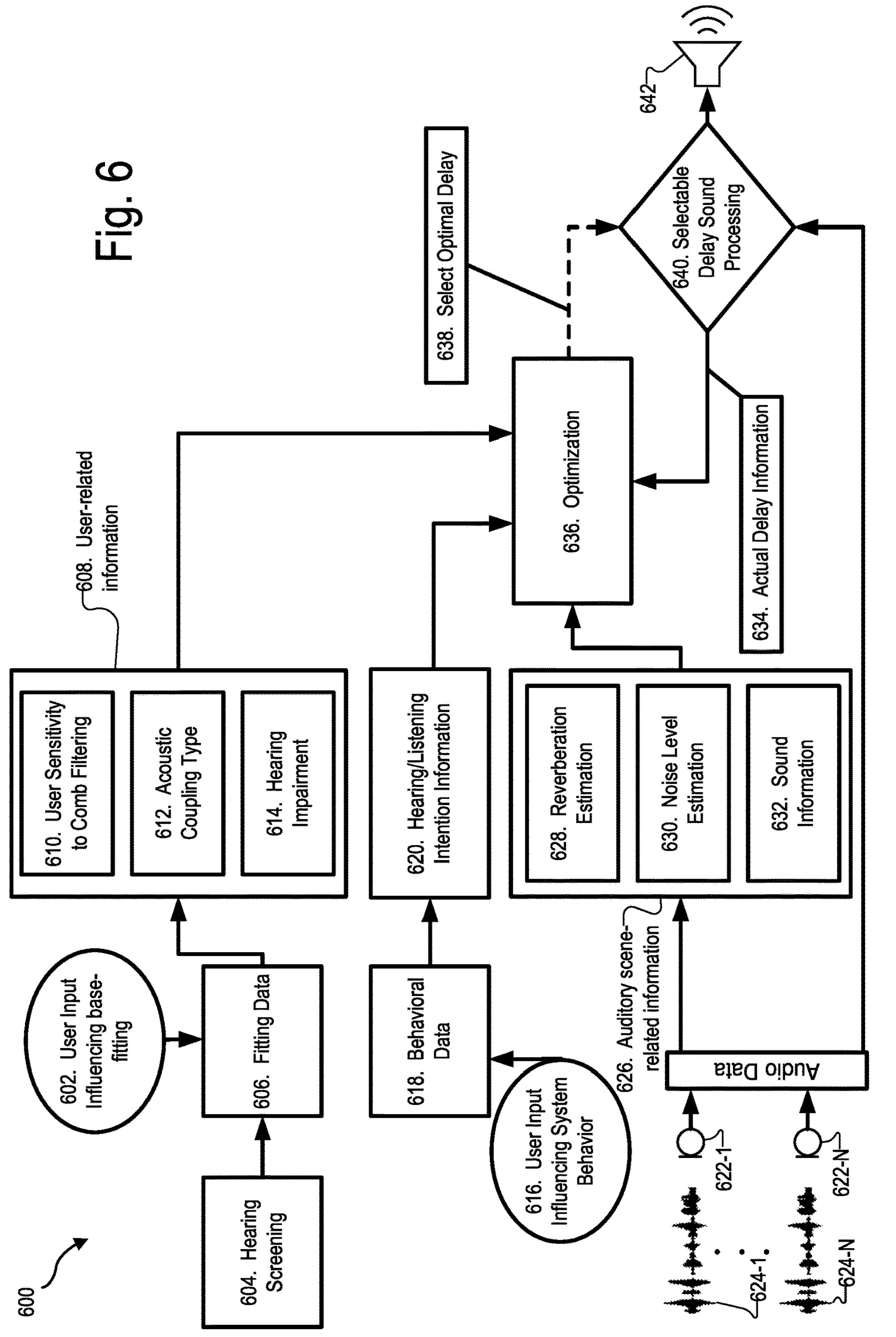

FIG. 6 shows an exemplary flow diagram 600 that depicts various types of information that may be used and/or operations that may be performed by system 100 to facilitate system 100 selecting an optimal sound processing delay scheme for use by hearing device 202. As shown in FIG. 6, user input influencing base-fitting information at block 602 and hearing screening information at block 604 may be provided as inputs to determine fitting data at block 606. The fitting data at block 606 may then be used to determine user-related information at block 608 such as user sensitivity to comb filtering effects at block 610, an acoustic coupling type at block 612, and hearing impairment information at block 614.

Information associated with user input influencing system behavior at block 616 may be provided as an input to determine behavioral data at block 618. The behavioral data may then be used by system 100 to determine hearing/listening intention information at block 620.

One or more microphones 622 (e.g., microphones 622-1 through 622-N) may be used to detect audio signals 624 (e.g., audio signals 624-1 through 624-N). Microphones 622 may be configured in any suitable manner. For example, microphone 622-1 may be placed on an outer part (e.g., a head piece or a remote microphone) of hearing device 202 and/or another microphone 622 may be provided within an ear canal of user 204.

Audio data associated with audio signals 624 may be provided as inputs to determine auditory scene-related information at block 626. Auditory scene-related information may include, for example, a reverberation estimation at block 628, a noise level estimation at block 630, and a determination of sound information at block 632.

As shown in FIG. 6, user-related information at block 608, hearing/listening intention information from block 620, auditory scene-related information from block 626, and actual delay information at block 634 may be provided as inputs for an optimization determination at block 636. The optimization determination may include system 100 selecting an optimal sound processing delay scheme at block 638 to be used by hearing device 202 based on the various inputs depicted in FIG. 6.

After system 100 selects the optimal sound processing delay scheme at block 638, system 100 may perform selectable delay sound processing of the audio signal at block 640. Based on the sound processing delay scheme and the selectable delay sound processing, system 100 may represent an audio signal to user 204 by way of, for example, speaker 642.

The arrow associated with block 638 is provided as a dashed line in FIG. 6 because the selection of a sound processing delay scheme at 638 may not be performed in instances where the currently implemented sound processing delay scheme is already suitable to represent audio content to user 204.

System 100 may be configured to continually monitor the various inputs provided for the optimization determination at block 636 and may change or update the optimal sound processing delay scheme selected at block 638 any suitable number of times.

In certain examples, system 100 may select a sound processing delay scheme that is adapted to specifically address own-voice activity of user 204. For example, system 100 may detect own voice activity for a predefined amount of time (e.g., within a time window of approximately 10-100 milliseconds). Based on the detection of own voice activity included as part of auditory scene data 306, system 100 may select a sound processing delay scheme with a relatively low delay path (e.g., low delay path 402-2) for all or part of the signal spectrum typical for an own-voice/human-speech frequency range. In such examples, system 100 may deactivate or reduce in intensity any medium delay paths or relatively longer delay paths. In so doing, the sound mixture that reaches the tympanic membrane may be dominated by direct air conducted sound from the mouth of user 204 to the ears of user 204 and the relatively low delay path amplified sound of hearing device 202.

During own voice activity, the need for amplification may be minimal and spectral enhancement may be selected time independent and may be well characterized by air conduction and a bone conduction hearing loss measurement. System 100 may implement a low delay path in an own-voice situation in any suitable manner. For example, system 100 may select a single channel own-voice compensation filter of the low delay path by inverting a certain percentage (e.g., 50%) of the air conduction loss (e.g., half-gain-rule). In certain alternative examples, system 100 may implement amplification schemes based on an air conduction threshold (e.g., National Acoustic Laboratories ("NAL"), Desired Sensation Level ("DSL"), etc.). The accuracy of an own-voice compensation filter associated with a low delay path used in own-voice amplification may be dependent on individual hearing loss influencing the compensation filter order and, as a result, the acoustic delay associated with the low delay path.

In certain examples, system 100 may facilitate measuring/testing the individual sensitivity of user 204 to their own voice quality for variations of the own-voice compensation filter associated with the low delay path. For example, system 100 may change the own-voice compensation filter while user 204 speaks. System 100 may then query user 204 in any suitable manner whether the change in the own-voice compensation filter is acceptable or not acceptable.

In certain examples, system 100 may select a sound processing delay scheme that is specifically adapted to address acoustic coupling associated with hearing device 202. As shown in FIG. 4, audio signal 406, when following direct sound path 402-1, reaches tympanic membrane 404 first. The frequency, content, and intensity of the direct sound of audio signal 406 depends on the acoustic coupling (e.g., how acoustically blocked is the ear canal with hearing device 202 in place compared to an unblocked ear canal). Typically, the acoustic coupling is reasonably constant over time. However, variation may occur during eating, longer wearing times, bodily activity, and/or due to mechanical forces modifying placement of hearing device 202 in the ear canal or behind the ear. Acoustic coupling may also vary due to active vent 214, which is switchable to change the acoustic coupling from being blocked, partially open, or fully open in different contexts (e.g., while user 204 is talking, while user 204 is streaming content by way of hearing device 202, etc.).

A relatively large acoustic vent opening leads to a reduced intensity of low frequency sounds but does not alter the mid and high frequency sounds. A relatively small acoustic vent opening may also reduce the mid and low frequency parts of direct sound. As such, in certain implementations, system 100 may select the sound processing delay scheme based on either static or active (e.g., with an active vent) acoustic coupling.

In low frequency regions with an open acoustic coupling, the signal processing in the low frequencies may be dominated by the low delay path for optimal sound quality while the high frequency region may be dominated by a relatively longer delay path for optimal frequency specific loss compensation (e.g., for sloping/ski slope hearing losses). The selection of the optimal delay for maximizing sound quality and hearing loss compensation by frequency specific amplification may be selected as a function of a vent dominated low-frequency cut-off of the direct sound. For an active vent functionality this may vary depending on the state of the active vent. An in-the-canal microphone may be used to monitor the effective vent attenuation (e.g., by comparing the microphones outside and inside of the ear canal for the direct sound part) and select the frequency region up to which the low delay path may dominate the processed sound and in which frequency regions the relatively longer delay path may be used without introducing comb-filter ripples on the sound mixture in the ear canal.

In certain implementations, detected comb filter ripple strength may be used to directly adjust a transition frequency and/or relative intensities of the multiple delay signal processing. Detecting comb-filter ripples in the low frequency region may lead to a reduction of the relatively longer delay signal processing in the respective frequency regions. On the other hand, no comb filter effects may allow for more dominance of the longer delay path(s) with potentially more powerful audio signal enhancement capabilities. The detection of comb-filter ripples may be performed in a time domain (e.g., periodicity analysis) and/or a frequency domain (e.g., spectral analysis).

In certain examples, system 100 may select a sound processing delay scheme that is specifically adapted to address reverberation. Users that benefit from sound enhancement typically suffer considerably in reverberant conditions. For example, even in very mild reverberant conditions (e.g., when healthy hearing people do not experience an auditory scene to be reverberant), users with hearing loss typically have difficulties separating different acoustic objects (e.g., talkers) from each other and/or the acoustic foreground from the acoustic background. The degree of reverberation or more explicitly the direct to reverberation ratio in a given auditory scene is a strong selector for the maximum amount of sound (signal to noise ratio) enhancement that is technically possible. Under such conditions, the selection for the most effective sound enhancement with a relatively long delay path is useful even if the relatively longer acoustic delay may add more copies of the audio signal reaching the tympanic membrane. The signal processing may be selected such that a maximally sound enhanced signal path dominates the sound mixture in the ear canal during listening phases of a conversation. The individual need for the amount of sound enhancement may be determined/measured/tested during a hearing device fitting process or estimated by system 100 based on audiometric data of user 204.

In certain examples, system 100 may select a sound processing delay scheme that is specifically adapted to address a listening/hearing intention of user 204. For example, in low-environmental noise conditions (e.g., when user 204 is alone in a silent home environment) the typical hearing system amplification may be high (with implementation of at least a typical delay signal path with good acoustic stability) to facilitate user 204 being environmentally aware (e.g., to facilitate user 204 hearing soft sounds and/or feeling connected to the acoustic scene).

In conditions with average to loud environments the need for additional amplification may be less than in quiet environments. As such, a low delay path may be sufficient and may facilitate user 204 participating in the selected hearing activity/listening intention. For example, in a street scene (e.g., while user 204 is walking on the sidewalk without conversation partner) the listening intention may be dominated by environmental awareness and preservation of localization and acoustic distance cues (e.g., a change in frequency, intensity, and/or doppler effects for approaching cars from behind). These conditions may be addressed by implementing a sound processing delay scheme with a low delay path with reduced gain. In such examples, the need for detailed frequency specific gain compensation and the perceptual constancy (e.g., avoidance of frequency independent gain variants) is of higher value.

Although linear gain settings across time and frequency may also be selected for a medium delay or long delay signal processing, the relative contribution of a direct signal path and a low delay signal path may facilitate preserving and even enhancing distance perception/externalization, which is perceptually reduced for relatively longer delay signal paths. For example, a sound processing delay scheme used for a street scene where a user is sitting in a street café may be different when the user wants to listen into a conversation at a near table as compared to when the user wants to communicate with the waiter. In such examples, the user's intention to communicate may be weighted more heavily in the selection of the sound processing delay scheme to be used by hearing device 202.

In certain additional or alternative implementations, system 100 may use any suitable sensor to determine a hearing/listening intention of user 204 while user 204 is not actively communicating. For example, a movement sensor may be used to detect a movement pattern of user 204 while the user walks, sits, and/or is being transported (e.g., by a bicycle, car, etc.). In such examples, individual user preferences may be weighted more heavily by system 100 in selecting a sound processing delay scheme to be implemented by hearing device 202.

Figure 7:
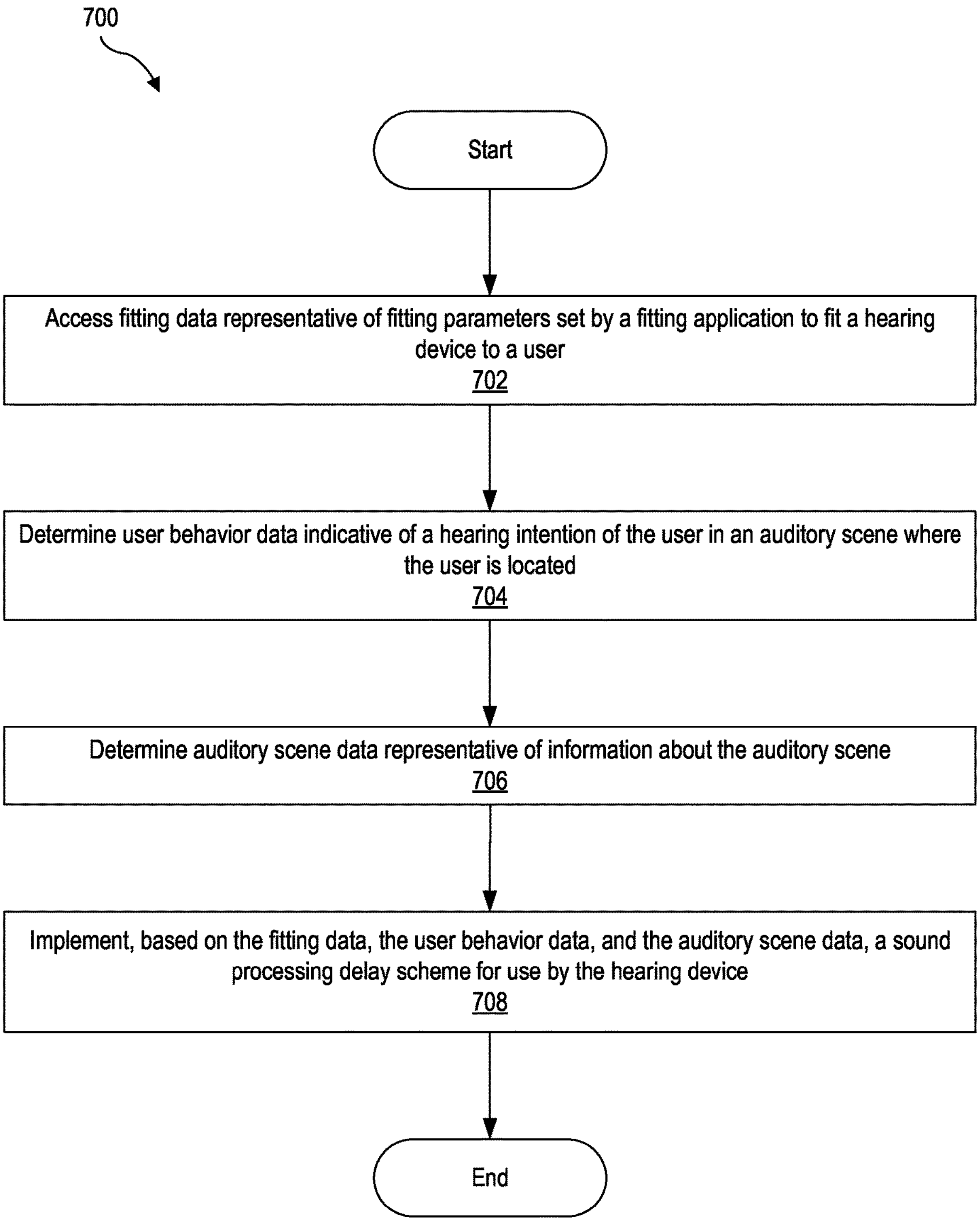
FIG. 7 illustrates an exemplary method according to principles described herein.

FIG. 7 illustrates an exemplary method 700 for selecting a sound processing delay scheme for a hearing device according to principles described herein. While FIG. 7 illustrates exemplary operations according to one embodiment, other embodiments may omit, add to, reorder, and/or modify any of the operations shown in FIG. 7. One or more of the operations shown in FIG. 7 may be performed by a hearing device such as hearing device 202, an external computing device communicatively coupled to hearing device 202, any components included therein, and/or any combination or implementation thereof.

At operation 702, a processing delay optimization system such as processing delay optimization system 100 may access fitting data representative of fitting parameters set by a fitting application to fit a hearing device to a user. Operation 702 may be performed in any of the ways described herein.

At operation 704, the processing delay optimization system may determine user behavior data indicative of a hearing intention of the user in an auditory scene where the user is located. Operation 704 may be performed in any of the ways described herein.

At operation 706, the processing delay optimization system may determine auditory scene data representative of information about the auditory scene. Operation 706 may be performed in any of the ways described herein.

At operation 708, the processing delay optimization system may implement, based on the fitting data, the user behavior data, and the auditory scene data, a sound processing delay scheme for use by the hearing device. Operation 708 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 8:
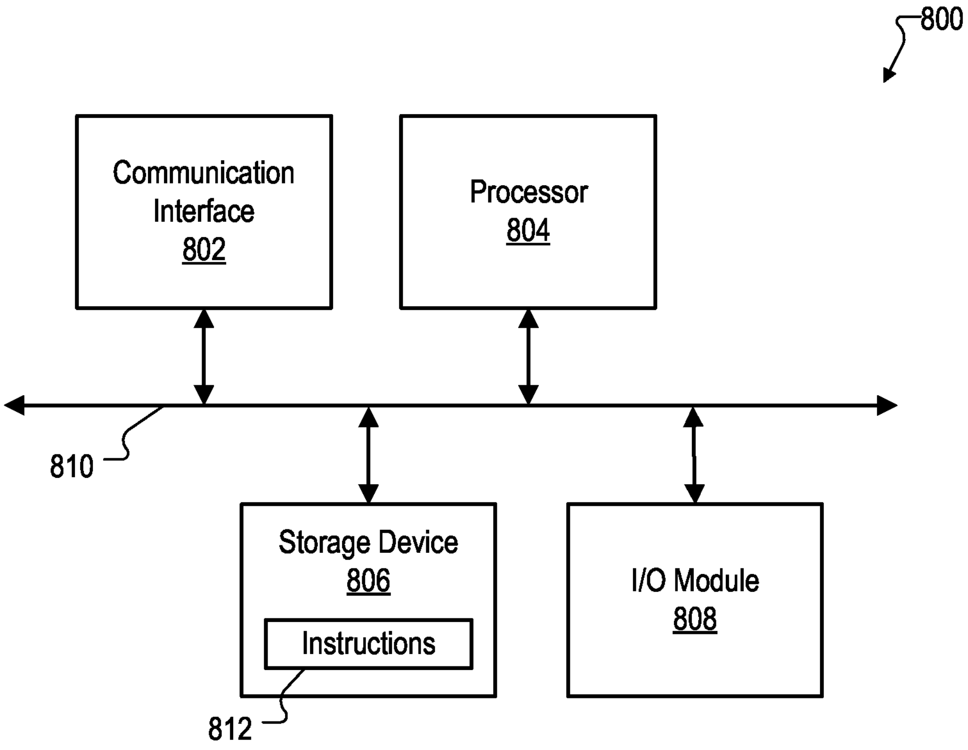
FIG. 8 illustrates an exemplary computing device according to principles described herein.

FIG. 8 illustrates an exemplary computing device 800 that may be specifically configured to perform one or more of the processes described herein. As shown in FIG. 8, computing device 800 may include a communication interface 802, a processor 804, a storage device 806, and an input/output ("I/O") module 808 communicatively connected one to another via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device. For example, storage device 806 may include, but is not limited to, any combination of the non-volatile media and/or volatile media described herein. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 800. For example, memory 102 or memory 208 may be implemented by storage device 806, and processor 104 or processor 210 may be implemented by processor 804.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

a memory storing instructions; and one or more processors communicatively coupled to the memory and configured to execute the instructions to perform a process comprising:

accessing fitting data representative of fitting parameters set by a fitting application to fit a hearing device to a user;

determining user behavior data indicative of a hearing intention of the user in an auditory scene where the user is located;

determining auditory scene data representative of information about the auditory scene; and implementing, based on the fitting data, the user behavior data, and the auditory scene data, a sound processing delay scheme for use by the hearing device.

2. The system of claim 1, wherein the process further comprises estimating, based on the fitting data, a sensitivity of the user of the hearing device to perceive a comb filter effect.

3. The system of claim 1, wherein the auditory scene data includes at least one of reverberation, sound level, sound type, or number of sound sources.

4. The system of claim 1, wherein the sound processing delay scheme is implemented to reduce perception of a comb filter effect by the user of the hearing device.

5. The system of claim 1, wherein:

the implementing of the sound processing delay scheme includes selecting one of a first sound processing delay scheme, a second sound processing delay scheme, and a third sound processing delay scheme;

the first sound processing delay scheme provides a first amount of acoustic delay;

the second sound processing delay scheme provides a second amount of acoustic delay that is less than the first amount of acoustic delay; and the third sound processing delay scheme provides a third amount of acoustic delay that is less than the first amount of acoustic delay and the second amount of acoustic delay.

6. The system of claim 1, wherein:

the process further comprises detecting, by using an in-the-canal microphone of the hearing device, a comb filter effect; and the implementing of the sound processing delay scheme is further based on the detecting of the comb filter effect.

7. The system of claim 6, wherein the detecting of the comb filter effect includes detecting a magnitude of the comb filter effect.

8. The system of claim 1, wherein the process further comprises:

detecting a change in at least one of the fitting data, the behavior data, or the auditory scene data; and implementing, based on the detected change, an additional sound processing delay scheme in place of the sound processing delay scheme.

9. A non-transitory computer-readable medium storing instructions that, when executed, direct a processor of a computing device to perform a process comprising:

accessing fitting data representative of fitting parameters set by a fitting application to fit a hearing device to a user;

determining user behavior data indicative of a hearing intention of the user in an auditory scene where the user is located;

determining auditory scene data representative of information about the auditory scene; and implementing, based on the fitting data, the user behavior data, and the auditory scene data, a sound processing delay scheme for use by the hearing device.

10. The non-transitory computer-readable medium of claim 9, wherein the process further comprises estimating, based on the fitting data, a sensitivity of the user of the hearing device to perceive a comb filter effect.

11. The non-transitory computer-readable medium of claim 9, wherein the auditory scene data includes at least one of reverberation, sound level, sound type, or number of sound sources.

12. The non-transitory computer-readable medium of claim 9, wherein the sound processing delay scheme is implemented to reduce perception of a comb filter effect by the user of the hearing device.

13. The non-transitory computer-readable medium of claim 9, wherein:

the implementing of the sound processing delay scheme includes selecting one of a first sound processing delay scheme, a second sound processing delay scheme, and a third sound processing delay scheme;

the first sound processing delay scheme provides a first amount of acoustic delay;

the second sound processing delay scheme provides a second amount of acoustic delay that is less than the first amount of acoustic delay; and the third sound processing delay scheme provides a third amount of acoustic delay that is less than the first amount of acoustic delay and the second amount of acoustic delay.

14. The non-transitory computer-readable medium of claim 9, wherein:

the process further comprises detecting, by using an in-the-canal microphone of the hearing device, a comb filter effect; and the implementing of the sound processing delay scheme is further based on the detecting of the comb filter effect.

15. A method comprising:

accessing, by a processing delay optimization system, fitting data representative of fitting parameters set by a fitting application to fit a hearing device to a user;

determining, by the processing delay optimization system, user behavior data indicative of a hearing intention of the user in an auditory scene where the user is located;

determining, by the processing delay optimization system, auditory scene data representative of information about the auditory scene; and implementing, by the processing delay optimization system and based on the fitting data, the user behavior data, and the auditory scene data, a sound processing delay scheme for use by the hearing device.

16. The method of claim 15, further comprising determining, by the processing delay optimization system and based on the fitting data, a sensitivity of the user of the hearing device to perceive a comb filter effect.

17. The method of claim 15, wherein:

the implementing of the sound processing delay scheme includes selecting one of a first sound processing delay scheme, a second sound processing delay scheme, and a third sound processing delay scheme;

the first sound processing delay scheme provides a first amount of acoustic delay;

the second sound processing delay scheme provides a second amount of acoustic delay that is less than the first amount of acoustic delay; and the third sound processing delay scheme provides a third amount of acoustic delay that is less than the first amount of acoustic delay and the second amount of acoustic delay.

18. The method of claim 15, further comprising detecting, by the processing delay optimization system and by using an in-the-canal microphone of the hearing device, a comb filter effect, wherein the implementing of the sound processing delay scheme is further based on the detecting of the comb filter effect.

19. The method of claim 18, wherein the detecting of the comb filter effect includes detecting a magnitude of the comb filter effect.

20. The method of claim 15, further comprising:

detecting, by the processing delay optimization system, a change in at least one of the fitting data, the behavior data, or the auditory scene data; and implementing, by the processing delay optimization system and based on the detected change, an additional sound processing delay scheme in place of the sound processing delay scheme.

* * * * *